(12) United States Patent
McPheters et al.

(10) Patent No.: US 7,054,045 B2
(45) Date of Patent: May 30, 2006

(54) HOLOGRAPHIC HUMAN-MACHINE INTERFACES

(75) Inventors: R. Douglas McPheters, Darien, CT (US); John Breitenbach, Hillsdale, NJ (US); John F. W. Perry, Burlington, VT (US)

(73) Assignee: HoloTouch, Inc., Darien, CT (US)

( * ) Notice: Subject to any disclaimer, the term of this patent is extended or adjusted under 35 U.S.C. 154(b) by 0 days.

(21) Appl. No.: 10/882,178

(22) Filed: Jul. 2, 2004

(65) Prior Publication Data

US 2005/0002074 A1   Jan. 6, 2005

Related U.S. Application Data

(60) Provisional application No. 60/484,838, filed on Jul. 3, 2003.

(51) Int. Cl.
*G02B 5/32* (2006.01)
(52) U.S. Cl. .................. 359/15; 359/32; 345/168; 345/175; 341/23
(58) Field of Classification Search .......... 359/13–15, 359/22–23, 25–26, 32–33; 345/7–9, 173, 345/168, 175; 341/23; 349/175
See application file for complete search history.

(56) References Cited

U.S. PATENT DOCUMENTS

| | | | |
|---|---|---|---|
| 4,818,048 A * | 4/1989 | Moss | 345/7 |
| 6,031,519 A * | 2/2000 | O'Brien | 345/156 |
| 6,243,054 B1 * | 6/2001 | DeLuca | 345/7 |
| 6,377,238 B1 * | 4/2002 | McPheters | 345/156 |
| 6,614,422 B1 * | 9/2003 | Rafii et al. | 345/168 |
| 6,650,318 B1 * | 11/2003 | Arnon | 345/168 |
| 6,665,100 B1 * | 12/2003 | Klug et al. | 359/23 |
| 2003/0193479 A1 * | 10/2003 | DuFaux | 345/168 |
| 2004/0095315 A1 * | 5/2004 | Montellese | 345/156 |

FOREIGN PATENT DOCUMENTS

| | | |
|---|---|---|
| JP | 2-66825 | 3/1990 |
| JP | 3-46724 | 2/1991 |
| JP | 3-217925 | 9/1991 |
| JP | 4-35950 | 3/1992 |

\* cited by examiner

*Primary Examiner*—Leonidas Boutsikaris
(74) *Attorney, Agent, or Firm*—Fitzpatrick, Cella, Harper & Scinto

(57) ABSTRACT

A holographic HMI allows data and commands to be entered into electronic equipment. The HMI involves no tangible physical contact between the human operator and the control elements because the input devices are holographic images of keys or other customarily touch-activated tangible input elements. Operator interaction is detected through electromagnetic means, obviating the need for direct physical contact with any solid input object or surface. Such HMIs generate a holographic image of a tangible input object of the tangible control mechanism. An illumination device illuminates the hologram to produce the holographic image. An actuation detection device detects the selection by the operator of a holographic image, and a signal generator receives the detection of the actuation detection device and provides an input signal to the electronic or electro-mechanical device thereby to produce the response. The hologram is affixed to a transparent or translucent material.

18 Claims, 7 Drawing Sheets

HOLOGRAPHIC HUMAN-MACHINE INTERFACES

This application claims the benefit of U.S. Provisional Application No. 60/484,838, filed Jul. 3, 2003, the disclosure of which is hereby incorporated by reference in its entirety, as if fully set forth herein.

BACKGROUND OF THE INVENTION

1. Field of Invention

The present invention relates to holographic human-machine interfaces ("HMIs") between humans and electronic or electro-mechanical devices.

2. Description of Related Art

There are many methods and devices available for entering data and commands into computers and other electronic equipment, such devices including, for example, keyboards, key pads, light pens, mice, pushbuttons, touch screens and trackballs. All of these input devices share a common feature: they require tangible physical contact by a user of the computer or electronic equipment. However, holographic HMIs involve no tangible physical contact between the human operator and the control elements of the HMIs because the input devices are holographic images of keys or other customarily touch-activated tangible input elements. Operator interaction with those holographic images is detected through electromagnetic means or other means, obviating the need for direct physical contact with any solid input object or surface.

Holographic HMIs between humans and electronic or electro-mechanical equipment are known in the art. Most notably, a "Holographic Control Arrangement" is described in U.K. Patent No. 2292711 (McPheters) and in U.S. Pat. No. 6,377,238 (McPheters), which are incorporated herein by reference.

Known holographic HMI systems may be characterized by the holographic HMI devices being relatively large and bulky, and they may consume relatively large amounts of power, making them impractical for some uses.

A problem may also occur with known holographic HMIs, when they are intended to replace touch screens or touch pads presenting multiple screens of information to the operator, because their holographic images cannot be smoothly integrated with input or output information available to the human operator on information presentation equipment of the electronic or electro-mechanical device being controlled.

In addition, a problem may occur when more than one piece of electronic or electro-mechanical equipment is controlled by holographic HMIs, requiring multiple holographic images. In such situations, an operator is easily distracted by the multiple images.

Another problem posed by present holographic HMIs is that, as compared with conventional interfaces, the operator of a holographic HMI receives no tactile feedback when interacting with a holographic HMI, which may cause the operator of the holographic HMI to lose track of the commands or information being entered into the electronic or electro-mechanical device.

Further, a problem may occur when the footprint of known holographic HMIs is not smaller than the physical dimensions of the conventional human-machine interfaces of the electronic or electro-mechanical device(s) being controlled.

SUMMARY OF INVENTION

The present invention is made in consideration of the above situations, and has the object to provide an apparatus for realizing the reduction of the power consumption, size and weight of conventional holographic HMIs. Further, the smoothness with which they can be integrated with information presentation features of the electronic or electro-mechanical device being controlled can be enhanced and the convenience of their human operators can be facilitated using the various methods of the present invention.

In order to attain the above objects, in accordance with the present invention, an apparatus is provided to allow an operator to control an electronic or electro-mechanical device of the type conventionally controlled by a tangible control mechanism having one or more customarily touch-activated tangible input objects, where physical contact with the device produces a response by the electronic or electro-mechanical device. The apparatus allows such control without the operator physically touching any solid object. The apparatus comprises hologram means for generating at least one of a plurality of holographic images of the one or more tangible input objects of the tangible control mechanism for the electronic or electro-mechanical device; illumination means for illuminating the hologram means to produce the at least one of a plurality of holographic images; actuation detection means for determining the selection by the operator of the at least one of a plurality of holographic images, generated by the hologram means, of the tangible input objects; and signal generation means for receiving the determination of the actuation detection means and providing an input signal to the electronic or electro-mechanical device thereby to produce the response, where the hologram means is affixed to a transparent or translucent material of the type including, but not limited to, glass, acrylic or plastic.

According to another aspect of the present invention, an apparatus is provided for allowing an operator to control more than one electronic or electro-mechanical device of the type conventionally controlled by a separate tangible control mechanism having at least one of a plurality of customarily touch-activated tangible input objects, where physical contact produces a response by the more than one electronic or electro mechanical devices. The apparatus allows such control without the operator physically touching any solid object. The apparatus comprises a hologram unit adapted to generate at least one of a plurality of holographic images of the one or more tangible input objects of the tangible control mechanism for the one electronic or electro mechanical devices; illumination means for illuminating the hologram unit to produce each holographic image; an actuation detector unit adapted to determine selection by the operator of each holographic image of the tangible input devices; a signal generator adapted to receive the determination of the actuation detector unit and provide an input signal to the devices thereby producing the response, where each of the generated holographic images is capable of independently producing a response by each electronic or electro mechanical device corresponding to that produced conventionally by the one or more tangible input objects of the tangible control mechanism of each such electronic or electro mechanical device.

According to another aspect of the present invention, a control arrangement apparatus for allowing an operator to control an electronic or electro-mechanical device of the type conventionally controlled by a tangible control mechanism having at least one of a plurality of customarily touch-activated tangible input objects, where physical contact with which produces a response by the device is provided. The control arrangement allows such control without an operator physically touching any solid object. The control arrangement comprises a composite hologram for generating a holographic image of at least one of a plurality of tangible input objects of the tangible control mechanism for the device, with the generated holographic image, for producing a response by the device, corresponding to that produced conventionally by each of tangible input objects of the tangible control mechanism. The composite hologram consists of a plurality of narrow holograms positioned side-by-side along a horizontal axis such that each of the holographic images presents a different thin vertical slice of what would otherwise be images of the tangible input objects, such that each of the narrow holographic images presented by the composite hologram can be separately viewed from a slightly different angle in the horizontal plane, either by the operator moving his or her head from right to left or left to right in the horizontal plane, by the operator slightly turning said composite hologram slightly from right to left or from left to right in the horizontal plane or by the hologram's being illuminated from different angles. An actuation detector for determining selection by the operator of the holographic image of the tangible input devices, and a signal generator for receiving the determination of the actuation detector and providing an input signal to the device thereby to produce the response.

DESCRIPTION OF THE PREFERRED EMBODIMENTS

FIRST EMBODIMENT—SENSOR POSITIONING

The first embodiment of the present invention provides a means for reducing the size and weight of holographic HMIs by positioning detecting sensors behind the hologram in relation to the operator, so as to permit those sensors to "look through" the medium upon which the hologram is mounted. This arrangement offers a desirable alternative to positioning of wave source sensors alongside the hologram or on the same side of the hologram as the operator because required hardware can be more compact, reducing the size and weight of the holographic HMI.

Certain types of wave source sensors suitable for use in the construction of holographic HMIs can "look through" certain types of materials on which holograms can be affixed, embossed or mounted. The types of materials on which holograms can be affixed, embossed or mounted include, but are not limited to, acrylic, glass and plastic, of varying thicknesses. Types of sensors that can "look through" those materials include, but are not limited to, those emitting/detecting certain wave lengths of infrared emissions, for example, a sensor emitting infrared light having a wavelength of approximately 880 nanometers.

Traditional reflection and transmission holograms are well known in the art and can be used in holographic HMIs. The former involves the use of a reconstructing light source positioned on the same side of the hologram as the HMI's operator while the latter involves a reconstructing light source positioned behind the hologram in relation to the operator either directly or through the use of reflective materials. A developing technology, the edge-lit hologram, offers potentially significant advantages in reducing the size and weight of holographic HMIs, as described below. In each case, it is well known in the art that holographic images are translucent, with the result that they can be projected in front of other objects without obscuring them.

While edge-lit holograms are known in the art (See S. A. Benton, S. M. Birner and A. Shirakura, "Edge-Lit Rainbow Holograms" in SPIE Proc. Vol. 1212, Practical Holography IV (Soc. Photo-Opt. Instr. Engrs., Bellingham, Wash. 1990)), their use in connection with holographic HMIs is believed to be not known in the art.

The images of an edge-lit hologram are reconstructed by using a light source positioned at an edge of a holographic HMI hologram, to illuminate that edge, thereby reconstructing that hologram's images at a distance from the material containing the edge-lit hologram, and obviating the physical separation between reconstructing light source and hologram that accompanies both reflection and transmission holograms.

Employing an edge-lit hologram as a holographic HMI's reconstructing light source eliminates the need for significant distance between an HMI's hologram and its reconstructing light source, which permits the use of smaller and lighter hardware to construct the HMI.

Figure 1:
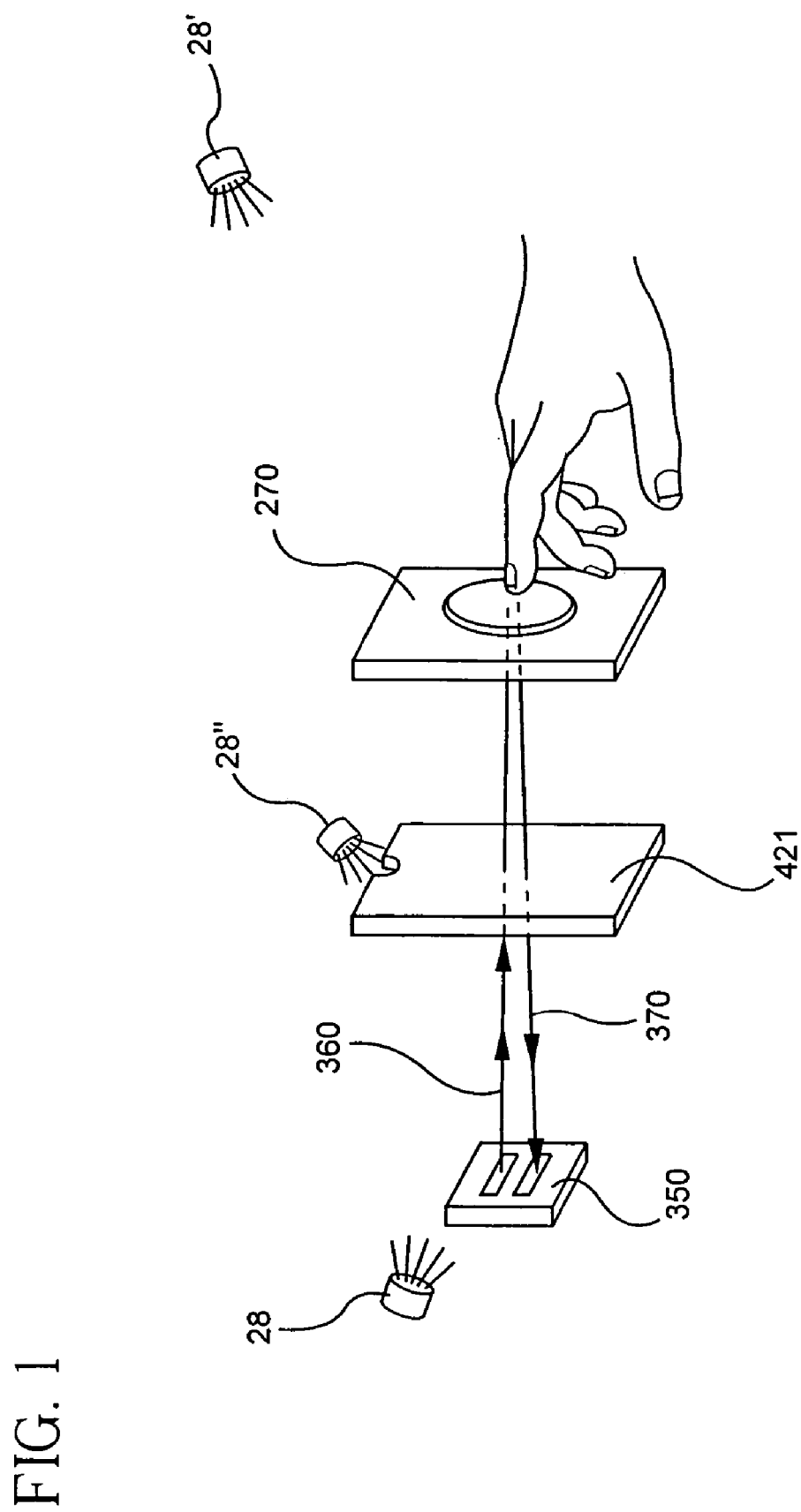
FIG. 1 is schematic functional representation of an HMI according to the principles of the invention, the sensor(s) of which, used to detect the operator's interaction with the holographic images, are positioned behind the hologram in relation to the operator.

FIG. 1 is a schematic functional representation of a HMI according to the principle of this invention in which the sensor(s) detecting an operator's interaction with holographic images of what would otherwise be keys or other customarily touch-activated tangible input devices of electronic or electro mechanical devices are positioned behind the hologram in relation to the operator. In FIG. 1, in the case where the hologram 421 is a transmission hologram, the reconstructing light source 28 is located behind the hologram 421 to thereby illuminate the hologram. Accordingly, a holographic image 270 is projected into the air in front of the operator. In the case where the hologram 421 is a reflection hologram, it is illuminated by a reconstructing light source 28', located in front of hologram 421. Again, a holographic image 270 is projected into the air in front of the operator. In the case where the hologram 421 is an edge-lit hologram, it is illuminated by a reconstructing light source 28" at its edge, and a holographic image 270 is projected into the air in front of the operator.

Techniques for generating holographic images from transmission, reflection and edge-lit holograms are well known in the art.

Actuation of the device may be detected by wave source emitter/detector 350 that emits wave 360, aimed at hologram 421. Because of this oblique angle, the wave as well as its reflection, passes through the material (not shown) on which the hologram is affixed, embossed or mounted. When the presence of a physical object (such as the operator's FIG. 11, indicated in FIG. 1 at 11) enters the apparent position of the holographic image 270, wave 360 is reflected to emitter/detector 350 as wave 370. Because of the transmissible nature of the composition of the material on which hologram 421 is affixed, embossed or mounted, the reflected wave is detected by emitter/detector 350, despite the presence of the material on which hologram 421 is mounted. The reflected wave causes emitter/detector 350 to transmit the operator's selection of the holographic image to the HMI's electronic or electro mechanical device in a way and with apparatus as described, for example, in U.S. Pat. No. 6,377,238.

SECOND EMBODIMENT—SCREEN-EDGE HMIs

The second embodiment of the present invention provides a means for positioning the hologram(s) so that their reconstructed holographic images of keys or other customarily touch-activated tangible input devices appear below, above, or on either side of the screen employed to present input or output information to an operator, with respect to the electronic or electro mechanical device(s) being actuated or controlled.

Figure 2:
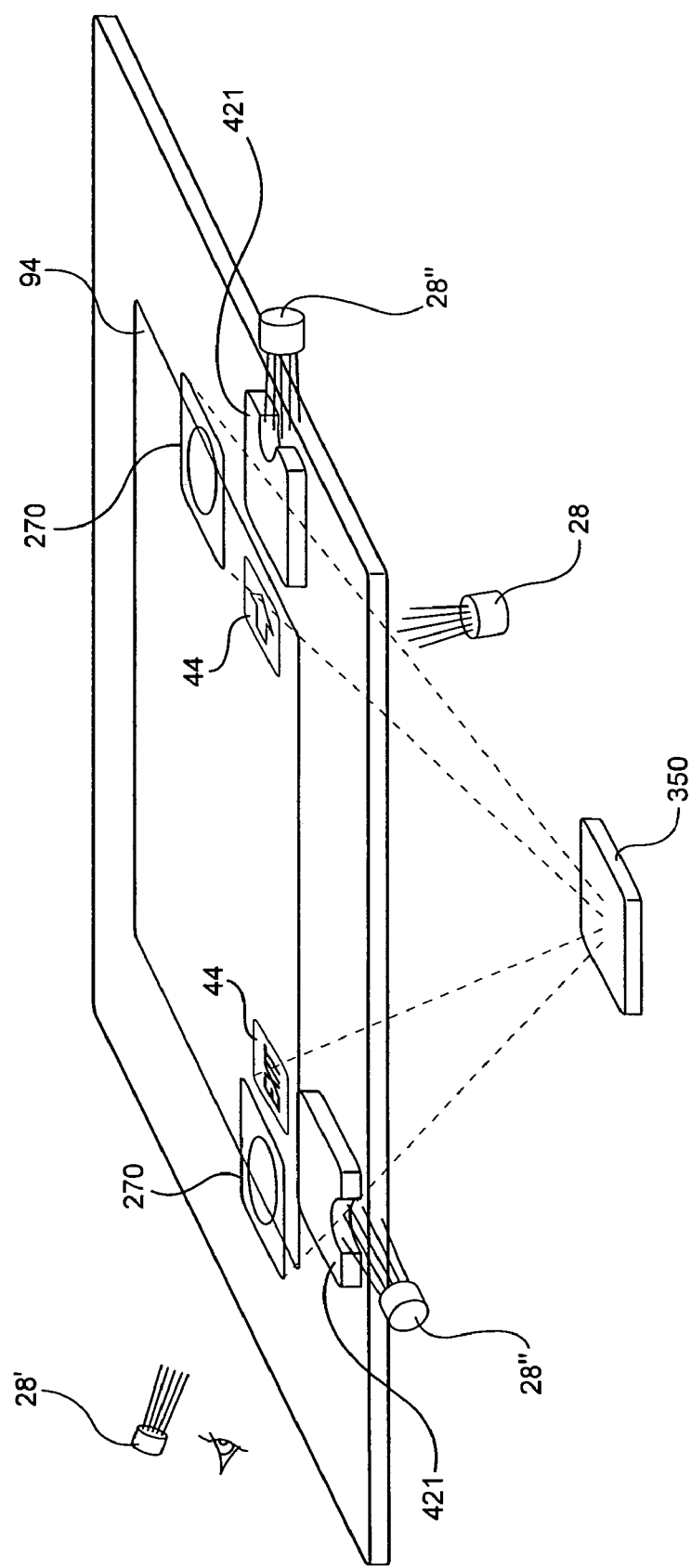
FIG. 2 is a schematic functional representation of an HMI according to the principles of the invention, the sensors of which, used to detect the operator's interaction, are positioned below, above, or to the side of an edge of a screen of the device employed to present input or output information to the operator of the electronic or electro mechanical device being controlled and the holographic images function as soft keys, determined by corresponding icons or other symbols on the screen.

In FIG. 2, information presentation device 94 (or other electronic presentation of information) concerning the electronic or electro mechanical device is actuated or controlled by holographic HMIs. Icons (or other symbols) 44 appearing on the information presentation device 94 indicate possible choices or selections for the operator of the holographic HMI's electronic or electro mechanical device. Holographic images 270 corresponding to icons (or other symbols) 44 are positioned below, above, or on either side of information presentation device 94 in order to facilitate the operator's entry of commands or information into the holographic HMI's electronic or electro mechanical device, acting as soft keys, the function of which is determined by the assigned functions of the icons (or other symbols). Holographic images 270 are reconstructed from holograms 421 by a reconstructing light source 28 located behind holograms 421, if holograms 421 are transmission holograms, by a reconstructing light source 28' located in front of holograms 421, if holograms 421 are reflection holograms, or by reconstructing light sources 28" if holograms 421 are edge-lit holograms. As shown in FIG. 2, sensor 350 is positioned so as to detect the intrusion of a finger or other physical object into the plane of each of holographic images 270 in the present embodiment.

Figure 4:
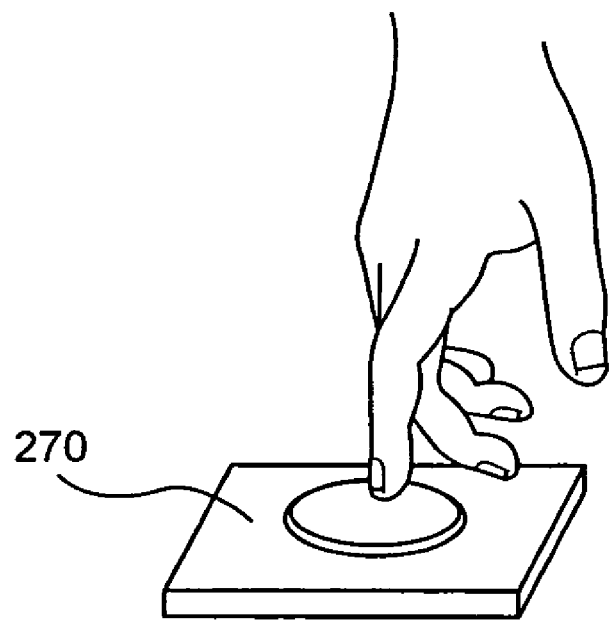
FIG. 4 is a schematic functional representation of one embodiment of an HMI according to the principles of the invention, where the physical separation between its hologram and reconstructing light source is reduced using one or more mirrors.
Figure 4:
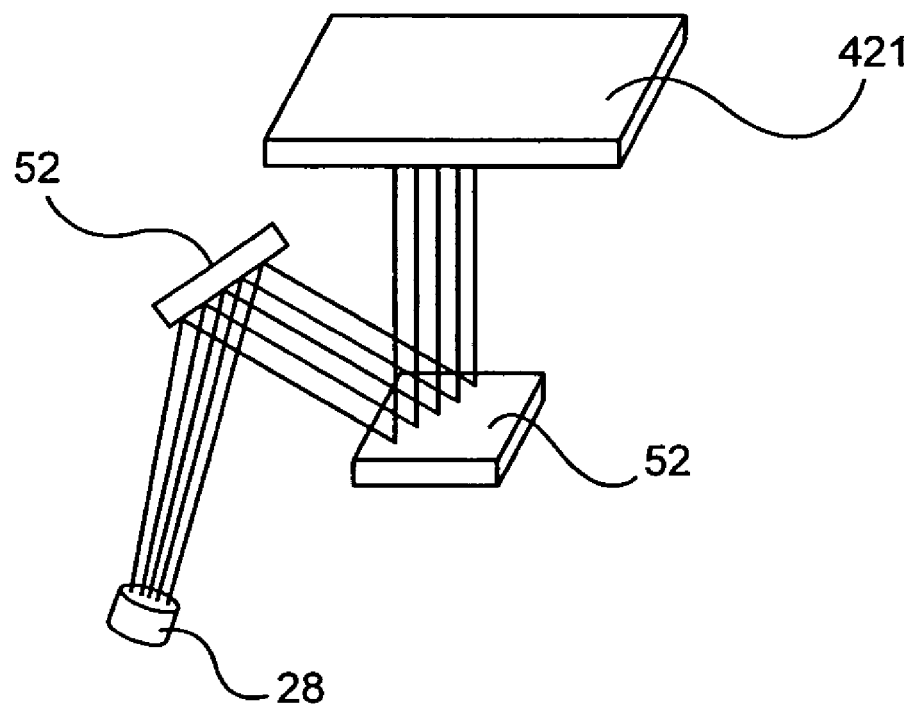

Shown in FIG. 4 is a schematic functional representation of one embodiment of an HMI according to the principles of the present embodiment where one or more mirrors 52 are used to alter the path of its reconstructing light source 28 in order to more conveniently position its hardware, where holograms 421 are transmission holograms, and their holographic images 270 are reconstructed by light source 28. In this embodiment of a screen-edge holographic HMI, the path of the reconstructing light source is "wrapped around" the hardware of the holographic HMI (not shown), providing a means to construct a compact holographic HMI using well known methods of reconstructing the images of a transmission hologram, so as to conveniently present holographic images according to the second embodiment of the present in a space-efficient manner.

By positioning a holographic HMI's images according to the principles of this embodiment, the electronic or electro mechanical device is capable of presenting multiple "screens" of information to the operator, selected by interacting with one or more of those holographic images appearing below, above or on either side of the screen of the device itself. The operator then makes his/her selections on each individual "screen" of information presentation device 94 by interacting with the different holographic images, in conjunction with corresponding characters, icons, letters, prompts or other symbols appearing on each individual "screen" appearing on information presentation device 94 which are proximate to the holographic images intended to enter data with respect to those characters, icons, letters, prompts or other symbols.

Holographic HMIs constructed according to the principles of this embodiment offer clearer information presentation on the information presentation device displaying information to the operator, as compared to conventional touch screens or touch pads.

THIRD EMBODIMENT—HMIs FOR MULTIPLE DEVICES

The third embodiment of the present invention provides a means for improving holographic HMIs intended for use in places or situations where two or more electronic or electro mechanical devices are to be actuated or controlled by a small number of people, such as vehicle or aircraft cockpits or industrial or military control facilities. A single hologram recorded according to methods known to artisans is positioned so as to project images of keys or other customarily touch-activated tangible input devices of two or more electronic or electro mechanical devices at a single location, convenient to the operator(s). This arrangement enhances operator convenience while limiting operator distraction from principal tasks by reducing the operator's need to look away from those tasks in order to interact with electronic or electro mechanical devices.

Figure 3:
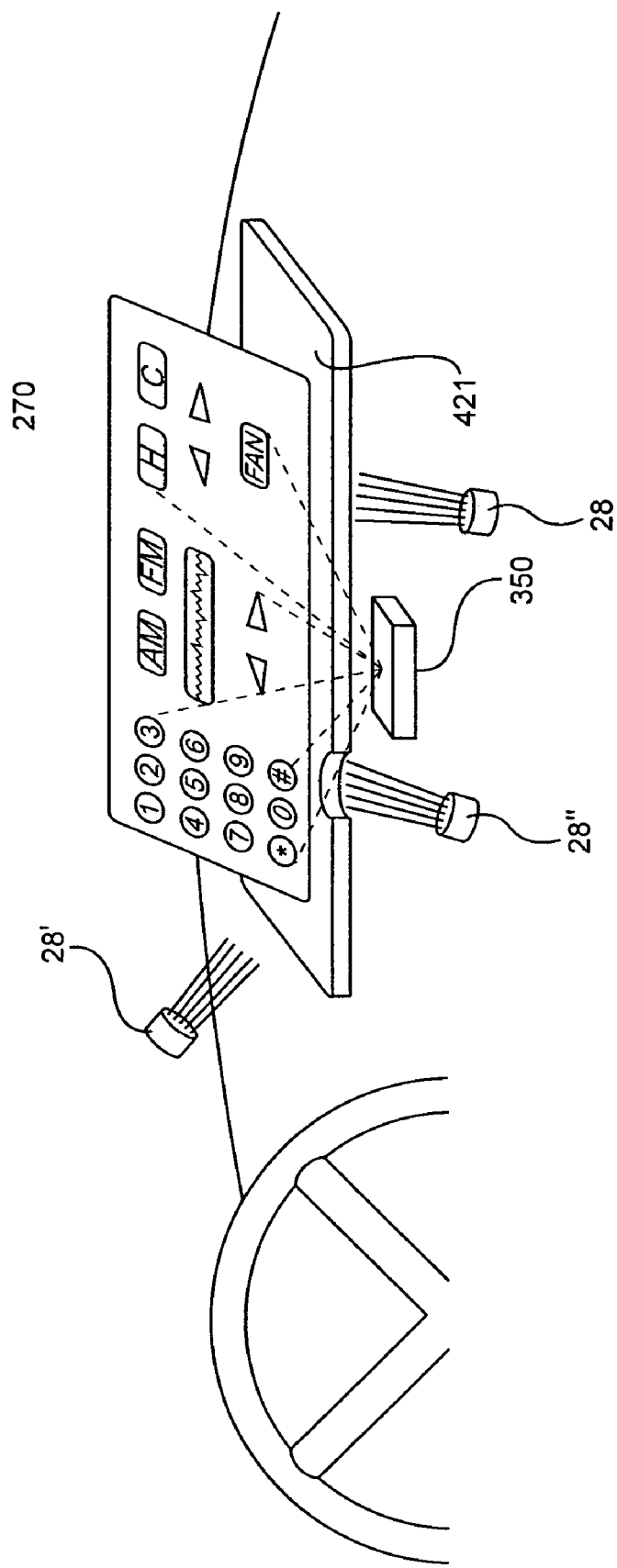
FIG. 3 is a schematic functional representation of an HMI according to the principles of the invention, where holographic images of more than one electronic or electro mechanical device interfaces are projected in one convenient location.

In one example of this embodiment, multiple electronic devices, such as those installed in an automobile cockpit, for example, cellular telephone, radio, air conditioning unit, global position equipment and the like, are actuated and controlled by interacting with a single holographic HMI projected from a hologram recorded according to principles known in the art, presenting translucent holographic images of what would otherwise be the keys or buttons of those devices to the operator, at a location convenient to the operator(s), as shown in FIG. 3. Because holographic images are translucent, they can be projected in front of the operator, for example, in an automobile driver's field of vision, without limiting the driver's view of the road ahead, in a pilot's field of vision, without distracting the pilot from what is going on outside the aircraft, or in front of equipment or gages in an industrial or military control facility, without limiting the operator's attention to that other equipment or gages.

In FIG. 3, holographic images 270 are reconstructed from hologram 421 by light source 28 located behind hologram 421, if hologram 421 is a transmission hologram, by light source 28' located in front of hologram 421, if hologram 421 is a reflection hologram, or by light source 28", if hologram 421 is an edge-lit hologram. In FIG. 3, sensor 350 detects the entry of a finger or other object into one or more of the holographic image 270.

FOURTH EMBODIMENT—RECONSTRUCTING LIGHT SOURCE ECONOMY

The fourth embodiment of the present invention provides a means for improving holographic HMIs employing transmission holograms by reducing their size and weight through compressing the distance between their reconstructing light sources and their holograms through recording them using a converging reference beam or by altering the direction of, or focusing or spreading, the light source employed in reconstructing their holographic images through the use of mirrors or lenses.

In this embodiment, using a converging reference beam in a known manner to record a transmission hologram results in a short light path between the hologram and its reconstructing light source. In effect, building the convergent properties of a lens into the hologram itself, saves size, space and weight in the resulting HMI and also reduces, if not eliminates, the need for intermediate mirrors or lenses. Mirrors can also be employed to shorten the physical separation between the reconstructing light source of the holographic HMI and the hologram containing an image of keys or other customarily touch-activated tangible input devices of the electronic or electro mechanical devices to be actuated or controlled. In addition, lenses can be used to shorten the physical separation between the reconstructing light source of the holographic HMI and the hologram, as well as focus that emission of the reconstructing light sources, achieving greater clarity of the resulting holographic images.

As is known in the art, the distance at which the reconstructing light source of the holographic HMI must be positioned from its transmission hologram in order to achieve optimum image resolution depends upon the angle of the convergence or divergence of the illuminating beam that is prescribed by the recording of the hologram itself. Using one or more mirrors, the total light path needed to reconstruct the holographic images of an HMI can be compressed into a smaller physical space, as shown in FIG. 4. It is also known that analogous effects can be achieved by altering that angle of convergence or divergence through either positioning a lens between light source and film while recording the hologram or by inserting one or more lenses between the reconstructing light beam and the hologram, as shown in FIG. 5.

In FIG. 4, mirrors 52 beneath transmission hologram 421 reflect light from reconstructing light source 28 to the hologram. Holographic images 270 are then reconstructed in the space above transmission hologram 421.

Figure 5:
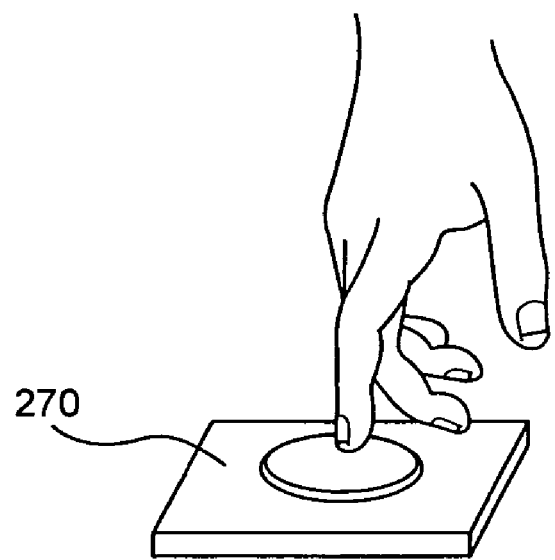
FIG. 5 is a schematic functional representation of one embodiment of an HMI according to the principles of the invention where the physical separation between its hologram and its reconstructing light is reduced using one or more lenses.
Figure 5:
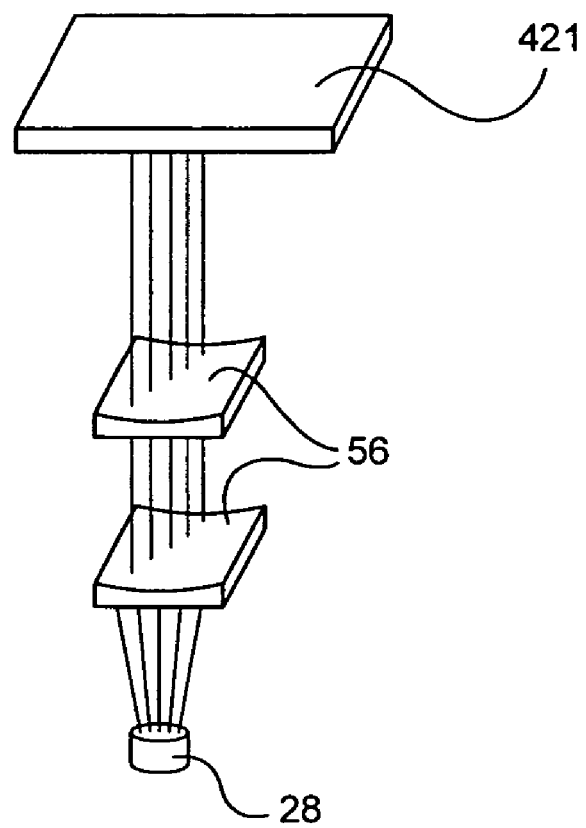

A similar effect can be achieved by focusing the reconstructing light beam through the use of one or more lenses, as shown in FIG. 5.

In FIG. 5, light from reconstructing light source 28 is converged or diverged by passing through lenses 56 before striking transmission hologram 421. Holographic images 270 are reconstructed in the space above transmission hologram 421.

A holographic HMI constructed according to the principles of this embodiment can be smaller and more compact owing to the reduced distance between its reconstructing light source and the transmission hologram itself.

FIFTH EMBODIMENT—SUBSTITUTE FOR TACTILE FEEDBACK

The fifth embodiment of the present invention provides an audible or visible response to the operator of a holographic HMI in the form of an electronic or other tone or a visual signal appearing on the information presentation device, such as a computer screen, to indicate the operator's selection of one or more holographic images of what would otherwise be keys or other customarily touch-activated tangible input devices of the electronic or electro mechanical device being actuated or controlled.

This improvement is advantageous because, unlike conventional HMIs, where an operator physically interacts with a key or other customarily touch-activated tangible device and receives a tactile response from touching the HMI, the operator of a holographic HMI receives no tactile feedback upon making a selection using the holographic HMI, since there is nothing to actually touch in interacting with a holographic HMI. Operator accuracy, comfort and speed are, therefore, facilitated by receiving audible or visible evidence of the entry of a command or selection into a holographic HMI according to the principles of this invention, as a substitute for the tactile feedback that an operator interacting with keys or other customarily touch-activated tangible input devices of the electronic or electro mechanical device being actuated or controlled would expect to feel.

Figure 6:
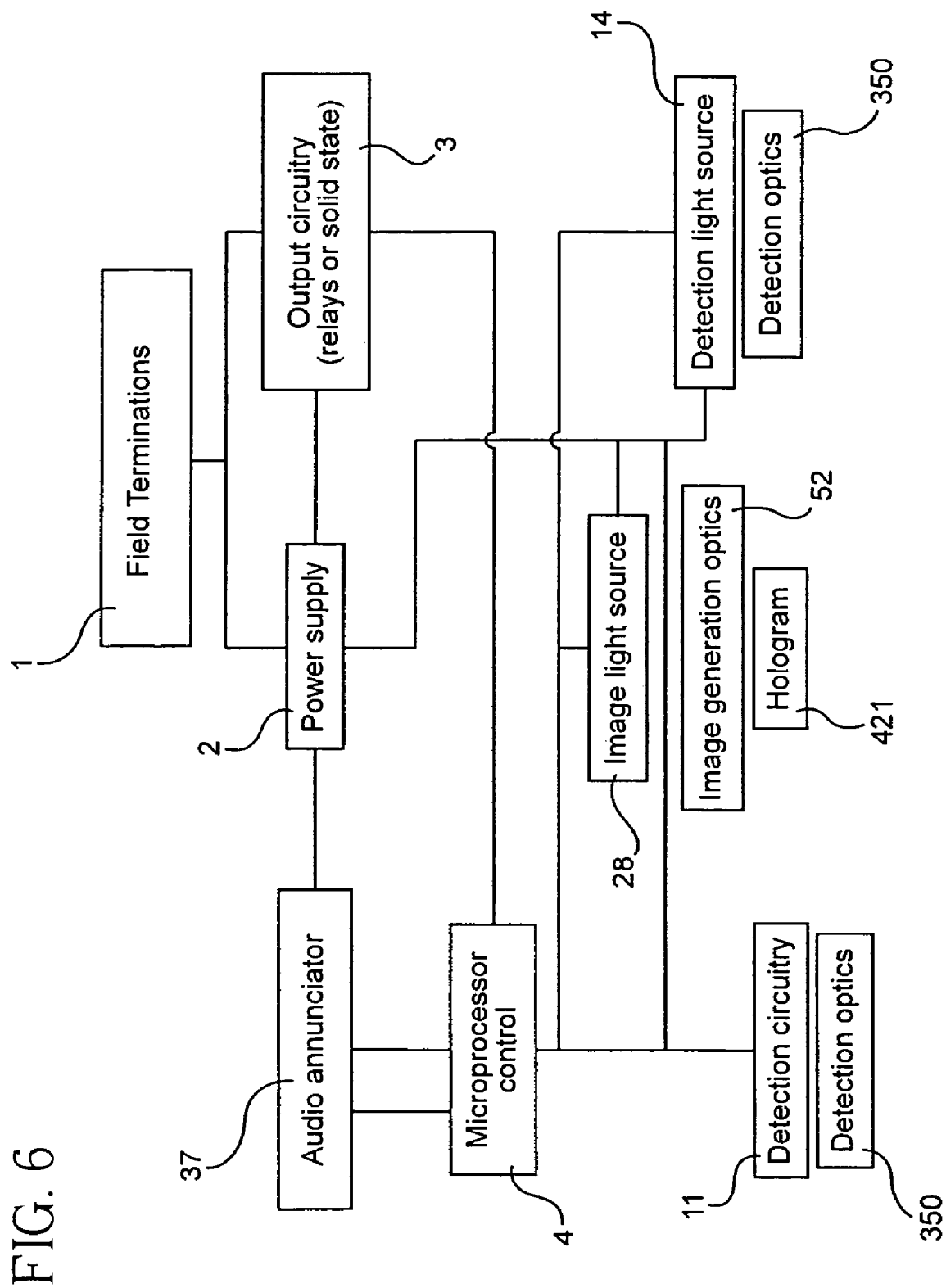
FIG. 6 is a block diagram of one embodiment of an HMI according to the principles of the invention, where an audio or visible response is provided to the operator upon interaction with the HMI, in lieu of a tactile response.

In a known manner, it is determined which electronic tones or visible signals can be produced by an electronic or electro mechanical device to be controlled by a holographic HMI and which commands to the software of that device must be supplied to that device in order to cause that device to emit one or more of those electronic tones or visible signals, in a manner that its operator can see or hear. In a manner known to artisans, the holographic HMI's software is programmed so as to cause the HMI, upon the operator's interacting with the holographic images of a holographic HMI constructed according to the principles of this embodiment, to transmit one or more commands, selected in order to elicit the desired electronic tone(s) or visible signal(s), to the internal circuitry of the electronic or electro-mechanical device being controlled, which causes the device's hardware to emit the desired electronic tone(s) or display the desired visible signal, clearly indicating to the operator(s) which command or selection has been entered into the electronic or electro mechanical device. FIG. 6 is a block diagram of circuitry according to the present invention that can be used to produce an audible feedback.

In FIG. 6, field terminations 1 connect a power supply 2 to external power sources for an HMI according to the principles of this invention and connect output circuitry 3, which may be relays or solid state circuits, to the electronic or electro mechanical device that HMI is intended to actuate or control. In FIG. 6, power supply 2 supplies power to output circuitry 3, detection wave source 14, image light source 28, microprocessor control 4, detection circuitry 11 and audio annunciator 37. Also in FIG. 6, image light source 28, which is controlled by microprocessor control 4, reconstructs the images of hologram 421, in conjunction with image generation optics 52, which may be mirrors or lenses according to the principles of this invention. As also shown in FIG. 6, detection optics 350, which may be contained in the same hardware, include the detection light source 14 and detection circuitry 11, determine when a finger or other object has interacted with those holographic images and signals that event to output circuitry 3 via microprocessor control 4, causing that signal to be transmitted to the electronic or electro mechanical device that HMI is intended to actuate or control as well as to audio annunciator 37. The annunciator 37, in turn, provides an audible indication that the interaction in question has been detected by that HMI.

SIXTH EMBODIMENT—MULTIPLE HOLOGRAPHIC IMAGES

The sixth embodiment of the present invention provides a means for improving holographic HMIs such that their holographic images of what would otherwise be keys or other customarily touch-activated tangible input devices of the electronic or electro-mechanical devices being actuated or controlled are larger than the physical footprint of the electronic or electro mechanical devices they are intended to actuate or control. The improved holographic HMI is therefore, larger and more convenient to use than the small tactile keyboards, keypads or touch screens found in conventional electronic or electro mechanical devices.

This is accomplished by recording images of what would otherwise be keys or other customarily touch-activated tangible input devices in one or more thin holograms so that their reconstructed images are visible to the operator(s) at slightly different angles across the horizontal or vertical axes, allowing the operator to input information with respect to each of those holographic images. The present embodiment is intended to provide operators with holographic HMIs of a comfortable size for normal fingers, not limited by the size of the electronic or electro mechanical devices employing them.

Figure 7:
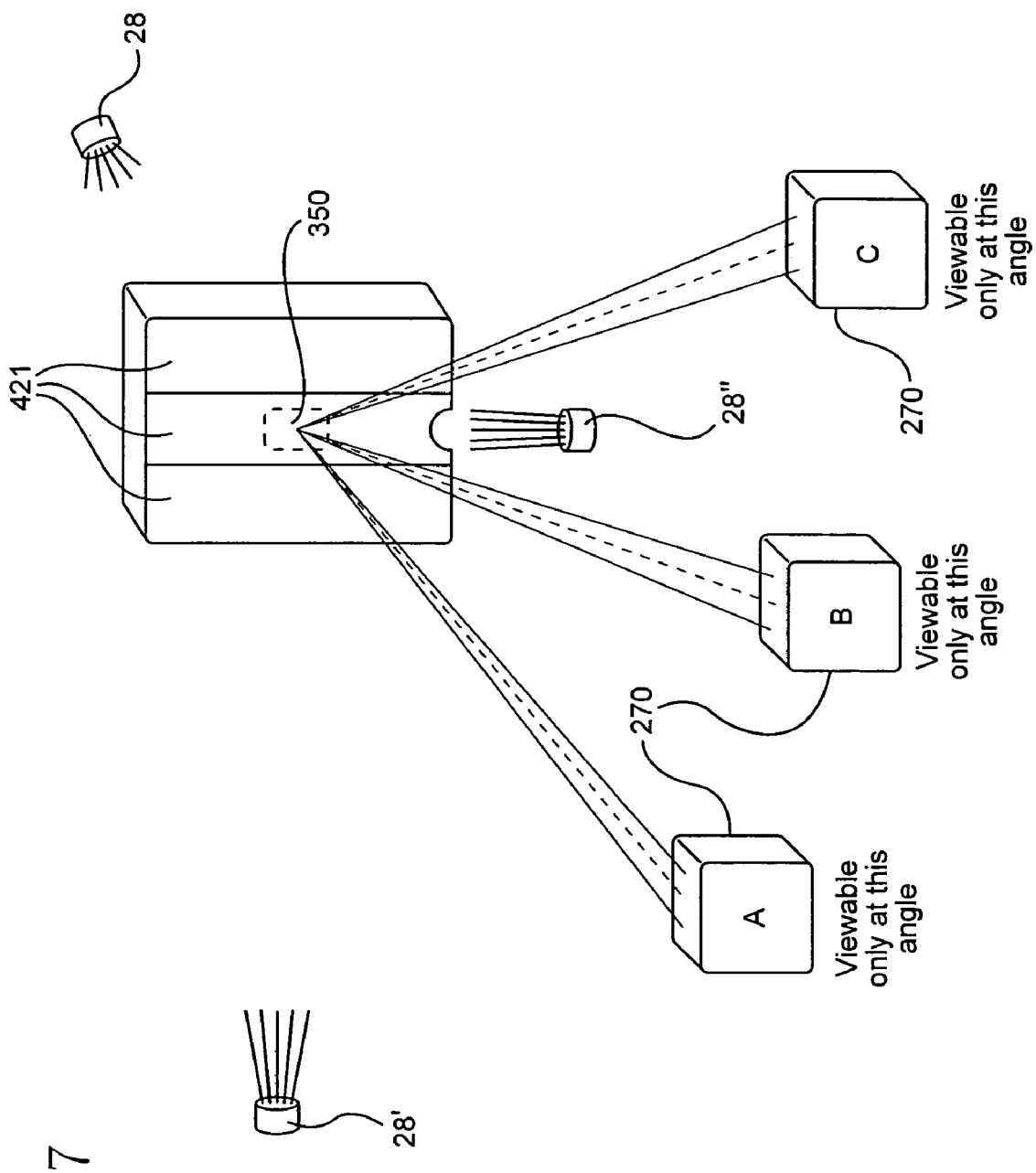
FIG. 7 is a schematic functional representation of one embodiment of an HMI according to the principles of the invention, where one or more narrow holograms are recorded in such as way as to allow the operator to see, and interact with, its reconstructed images from different angles along the horizontal or vertical axes.

In one example of the present embodiment, shown in FIG. 7, one or more narrow holograms 421 are positioned so that their reconstructing light sources cause each of their holographic images to be viewable by the HMI's operator from a slightly different angle across the horizontal or vertical axes.

In FIG. 7, holographic images 270 are reconstructed from holograms 421 by light source 28 located behind holograms 421, if holograms 421 are a transmission holograms, by light source 28' located in front of holograms 421, if holograms 421 are reflection holograms or by light source 28", if holograms 421 are edge-lit holograms.

As is known, laser-viewable holograms are suitable for recording and reconstructing images of holograms intended to be viewable at different angles across both horizontal and vertical axes because of their favorable parallax qualities, for use in the manner contemplated by the present embodiment.

Each of the holographic images presented by the holograms contemplated by the present embodiment can be viewed from a slightly different angle, either by the operator moving his or her head slightly to the right or left or up or down, by the operator slightly turning the holographic HMI slightly from right to left or from left to right, or up or down, or by illuminating those holograms with different light sources from different angles, or by the light source moving so as to reconstruct the images of the hologram(s) from different angles.

As shown in FIG. 7, sensor 350 is positioned so as to detect the intrusion of a finger or other physical object into the plane of each of holographic images 270 in the present embodiment, at the angle at which those images appear in relation to the HMI. Using known techniques, the holographic HMI transmits the command or information represented by the holographic image selected by the operator(s) to the HMI's electronic or electro mechanical device.

The present embodiment is an improvement with respect to the size of the HMI's physical structure, and, therefore, improves its convenience of use and weight.

In the interest of completeness, specifications for holographic HMIs as presently contemplated, are attached as Appendix A and are incorporated herein by reference in their entirety.

While the present invention has been disclosed with respect to what are presently considered to be the preferred embodiments, the invention is not limited to those embodiments. Rather, the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. An apparatus allowing an operator to control an electronic or electro-mechanical device of the type conventionally controlled by a tangible control mechanism having one or more customarily touch-activated tangible input objects, physical contact with which produces a response by the electronic or electro-mechanical device, said apparatus allowing such control without the operator physically touching any solid object and comprising:
   hologram means for generating a holographic image of a tangible input object of the tangible control mechanism for the electronic or electro-mechanical device;
   illumination means for illuminating said hologram means to produce the holographic image;
   actuation detection means for detecting selection by the operator of the holographic image, generated by said hologram means, of the tangible input object; and
   signal generation means for receiving the detection of said actuation detection means and providing an input signal to the electronic or electro-mechanical device thereby to produce the response,
   wherein said hologram means is affixed to at least one of a transparent material and a translucent material, and
   the actuation detection means comprises emission/detection means for producing and receiving electromagnetic radiation, said emission/detection means being positioned on a side of said hologram means opposite the operator and being positioned to transmit and receive electromagnetic radiation toward the holographic image and through said material to which said hologram means is affixed.

2. An apparatus according to claim 1, wherein said at least one of said transparent material and said translucent material is selected from glass, acrylic, and plastic.

3. An apparatus according to claim 1, further comprising at least one mirror so as to alter said illumination means light path to position one or more holographic image on an edge of a screen that is employed to present information to the operator.

4. An apparatus for allowing an operator to control a plurality of electronic or electro-mechanical devices of the type conventionally controlled by a separate tangible control mechanism having a plurality of customarily touch-activated tangible input objects, physical contact with which produces a response by at least one of the electronic or electro-mechanical devices, the apparatus allowing such control without the operator physically touching any solid object and comprising:
- a hologram unit adapted to generate a plurality of holographic images, each comprising the tangible input objects of the tangible control mechanism for a corresponding one of the plurality of the electronic or electro-mechanical devices;
- an illuminator adapted to illuminate said hologram unit to produce the plurality of holographic images;
- an actuation detector adapted to detect selection by the operator of each of the plurality of holographic images of the tangible input devices; and
- a signal generator adapted to receive the detection of said actuation detector and provide an input signal to the devices thereby producing the response,
- wherein said actuation detector and said signal generator are configured to independently produce a response by each electronic or electro-mechanical device upon detection of selection of each independent one of said holographic images, and
- the actuation detector comprises an emitter/detector that produces and receives electromagnetic radiation, said emitter/detector being positioned on a side of said hologram unit opposite the operator and being positioned to transmit and receive electromagnetic radiation toward the holographic images and through said hologram unit.

5. A control arrangement apparatus for allowing an operator to control an electronic or electro-mechanical device of the type conventionally controlled by a tangible control mechanism having a plurality of customarily touch-activated tangible input objects positioned on a plurality of portions thereof, physical contact with which produces a response by the device, said control arrangement allowing such control without an operator physically touching any solid object and comprising:
- a composite hologram for generating a holographic image of the plurality of tangible input objects of the tangible control mechanism for the device, with the generated holographic image for producing a response by the device corresponding to that produced conventionally by the plurality of tangible input objects of the tangible control mechanism, said composite hologram comprising a plurality of holograms positioned side-by-side along one axis such that each of the holographic images produced thereby represents a different portion of the tangible control mechanism, such that each of the holographic images can be separately viewed from a different angle relative to said one axis;
- an actuation detector for detecting selection by the operator of the holographic image of each of the tangible input devices; and
- a signal generator for receiving the detection of said actuation detector and providing an input signal to the device thereby to produce the response,
- wherein the actuation detector detects the selection using electromagnetic radiation that passes through the composite hologram.

6. A control arrangement apparatus according to claim 5, wherein said composite hologram consists of a plurality of holograms positioned side-by-side along a second axis generally perpendicular to said one axis such that each of the holographic images represents a different portion of the tangible input objects, such that each of the holographic images presented by said composite hologram can be separately viewed from a different angle relative to said second axis.

7. An apparatus as in claim 1, wherein said hologram means generates a plurality of holographic images, each of one of a plurality of tangible input objects, and wherein said actuation detection means is capable of detecting which of said plurality of holographic images is selected by the operator.

8. An apparatus as in claim 1, further comprising at least one mirror interposed between said hologram means and said illumination means so as to shorten the physical distance between said hologram means and said illumination means and nevertheless produce the holographic image.

9. An apparatus as in claim 1, wherein said hologram means includes a lens with convergent properties.

10. An apparatus as in claim 1, further comprising at least one lens interposed between said hologram means and said illumination means so as to shorten the physical distance between said hologram means and said illumination means and nevertheless produce the holographic image.

11. An apparatus as in claim 1, wherein said signal generation means also generates at least one of an audible signal and a visible signal to indicate to the operator that the actuation detection means has detected selection of the holographic image by the operator.

12. An apparatus as in claim 1, wherein said illumination means comprises a reconstructing light source located at the edge of the material to which said hologram means is affixed.

13. An apparatus as in claim 4 or 5, wherein said hologram unit generates a plurality of holographic images, each of one of a plurality of tangible input objects, and wherein said actuation detector is capable of detecting which of said plurality of holographic images is selected by the operator.

14. An apparatus as in claim 4 or 5, further comprising at least one mirror interposed between said hologram unit and said illuminator so as to shorten the physical distance between said hologram unit and said illuminator and nevertheless produce the holographic image.

15. An apparatus as in claim 4 or 5, wherein said hologram unit includes a lens with convergent properties.

16. An apparatus as in claim 4 or 5, further comprising at least one lens interposed between said hologram unit and said illuminator so as to shorten the physical distance between said hologram unit and said illuminator and nevertheless produce the holographic image.

17. An apparatus as in claim 4 or 5, wherein said signal generator also generates at least one of an audible signal and a visible signal to indicate to the operator that the actuation detector has detected selection of the holographic image by the operator.

18. An apparatus as in claim 4 or 5, wherein said illuminator comprises a reconstructing light source located at the edge of a material to which said hologram unit is affixed.

* * * * *